Aug. 8, 1939. N. J. POUX 2,169,176
METHOD OF MAKING SEPARABLE FASTENERS
Original Filed Dec. 16, 1933  7 Sheets—Sheet 1
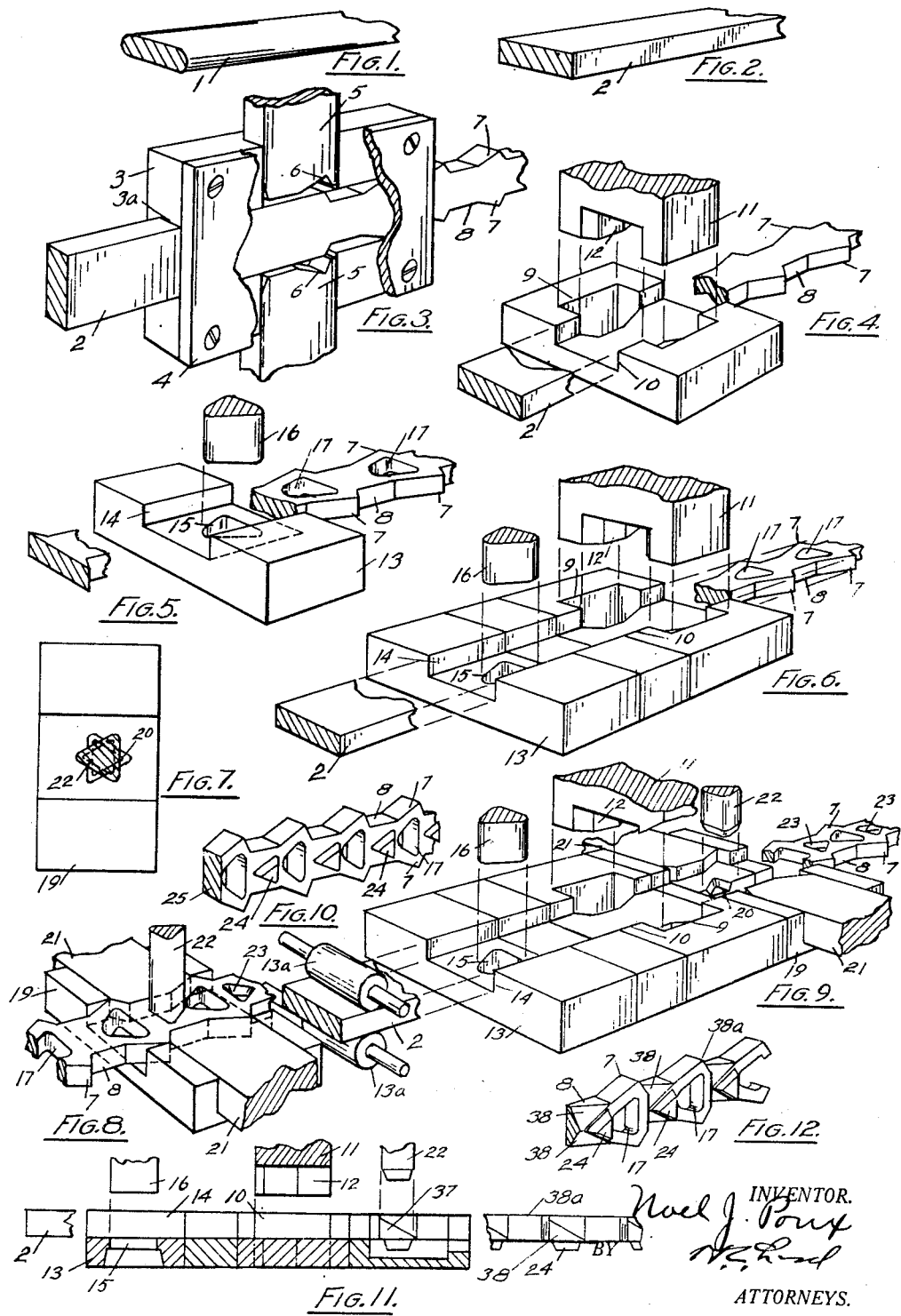

Aug. 8, 1939.   N. J. POUX   2,169,176
METHOD OF MAKING SEPARABLE FASTENERS
Original Filed Dec. 16, 1933   7 Sheets-Sheet 2
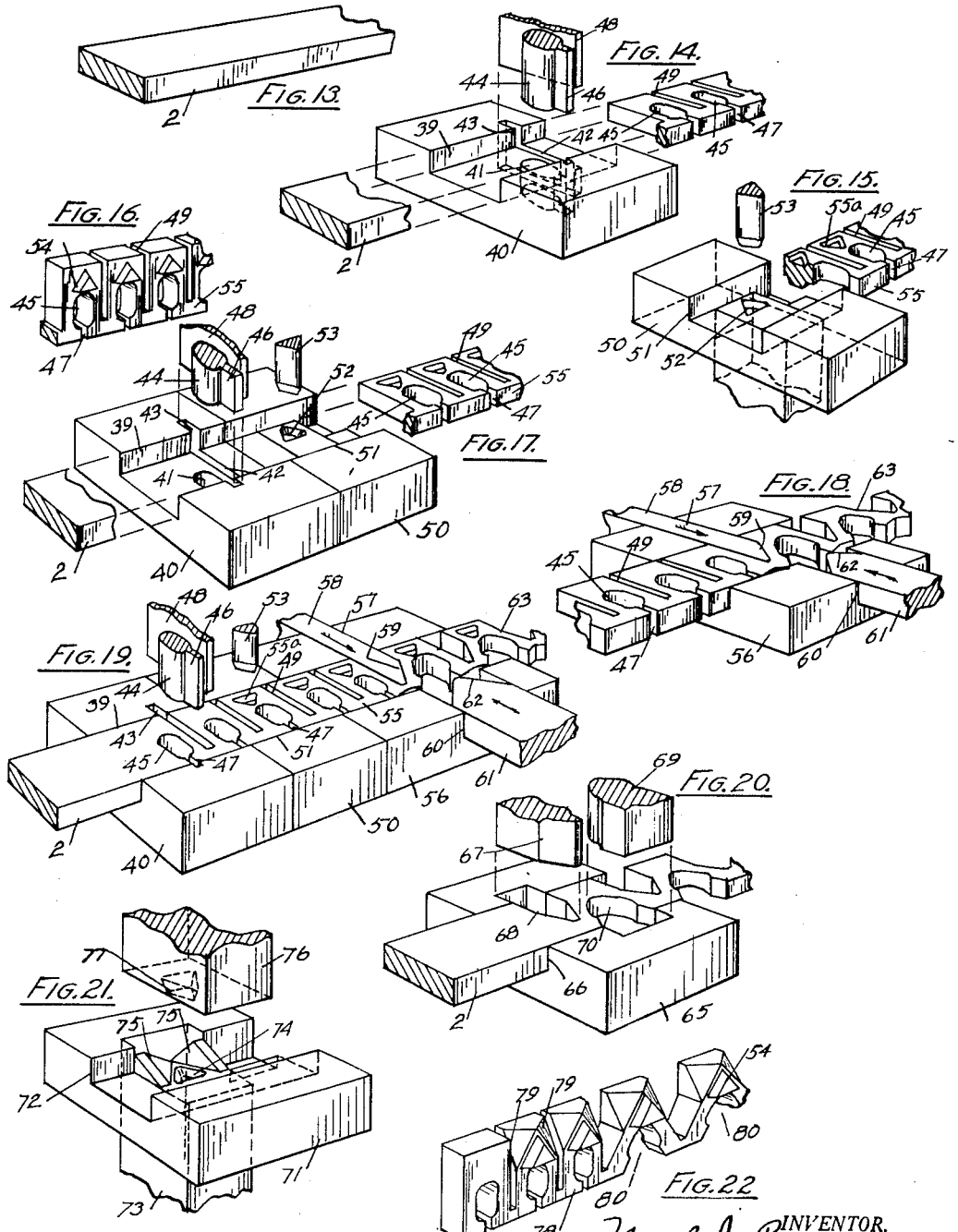

Aug. 8, 1939    N. J. POUX    2,169,176
METHOD OF MAKING SEPARABLE FASTENERS
Original Filed Dec. 16, 1933    7 Sheets-Sheet 3
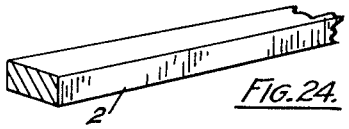
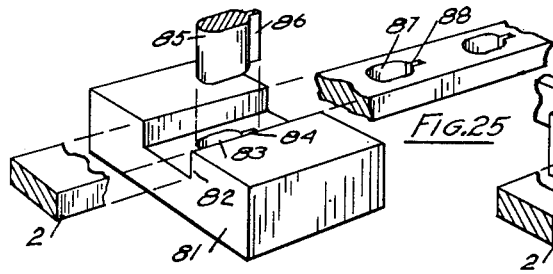
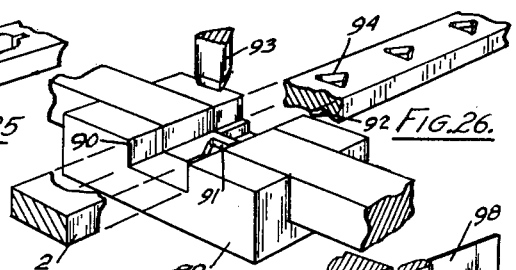
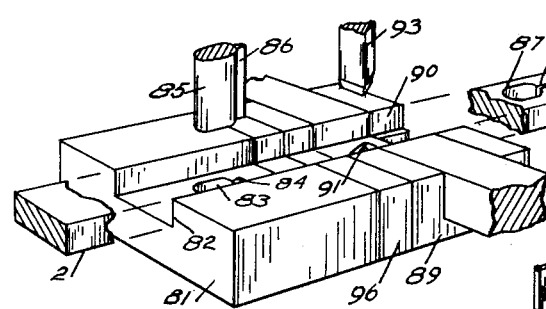
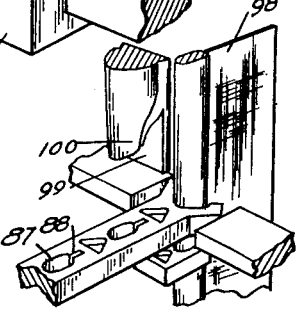
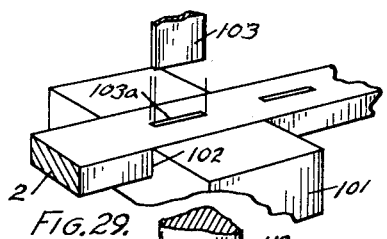
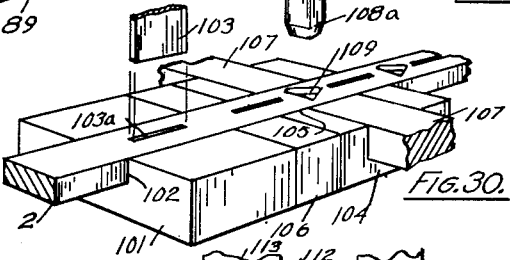
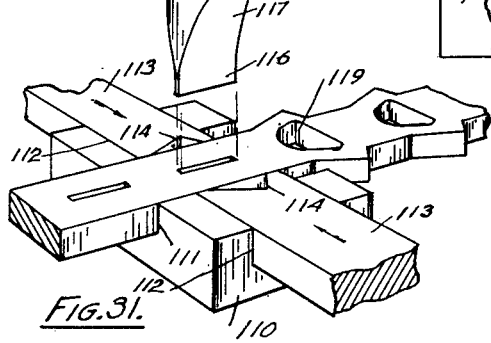
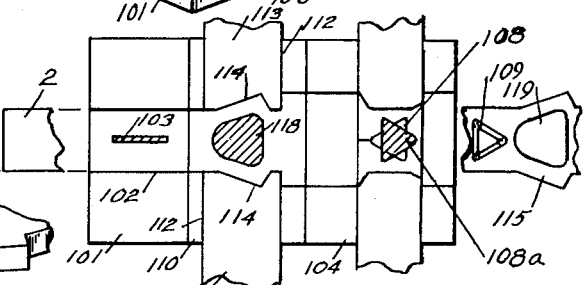
Noel J. Poux
INVENTOR.
BY
ATTORNEYS.

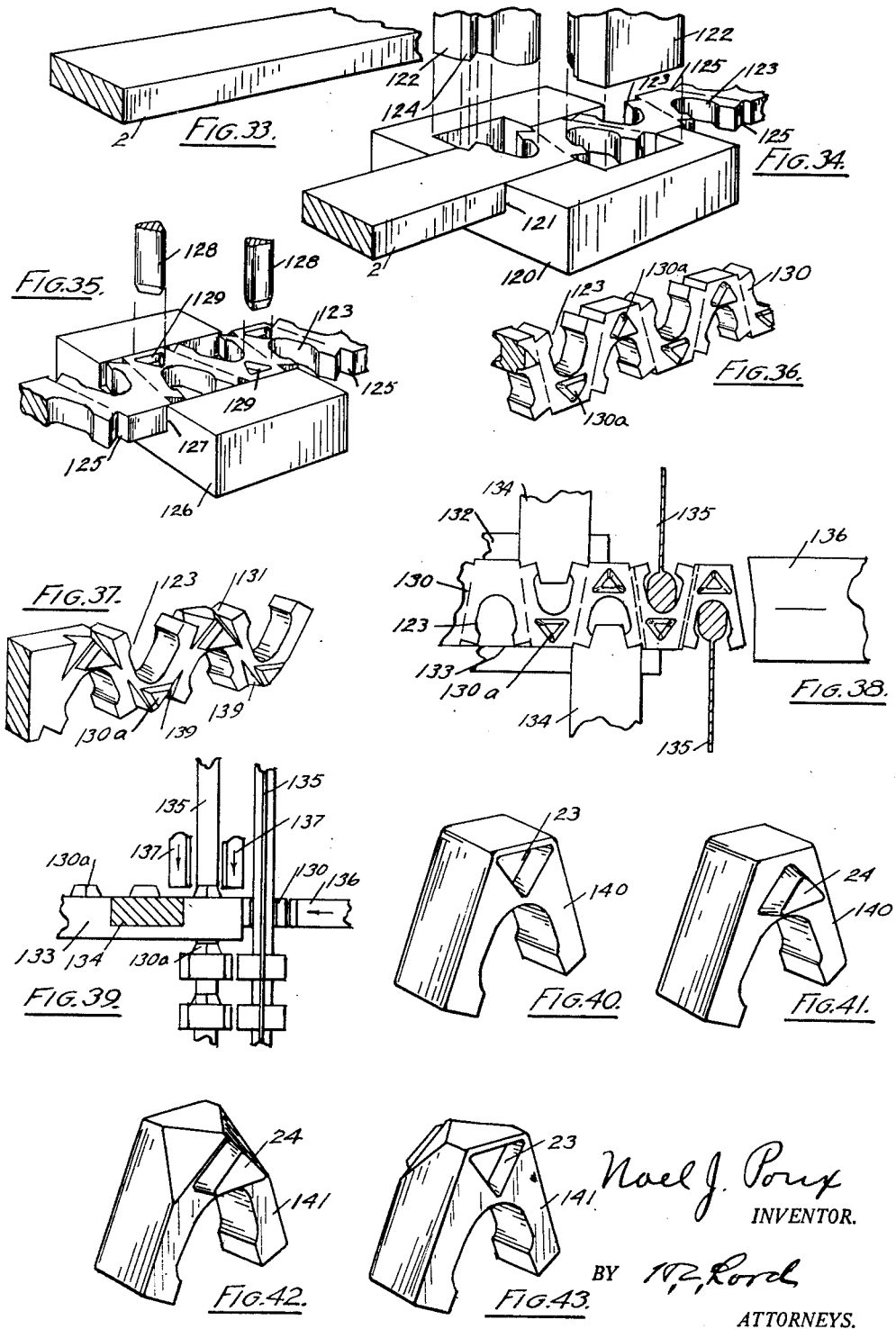

Aug. 8, 1939.   N. J. POUX   2,169,176
METHOD OF MAKING SEPARABLE FASTENERS
Original Filed Dec. 16, 1933   7 Sheets-Sheet 5
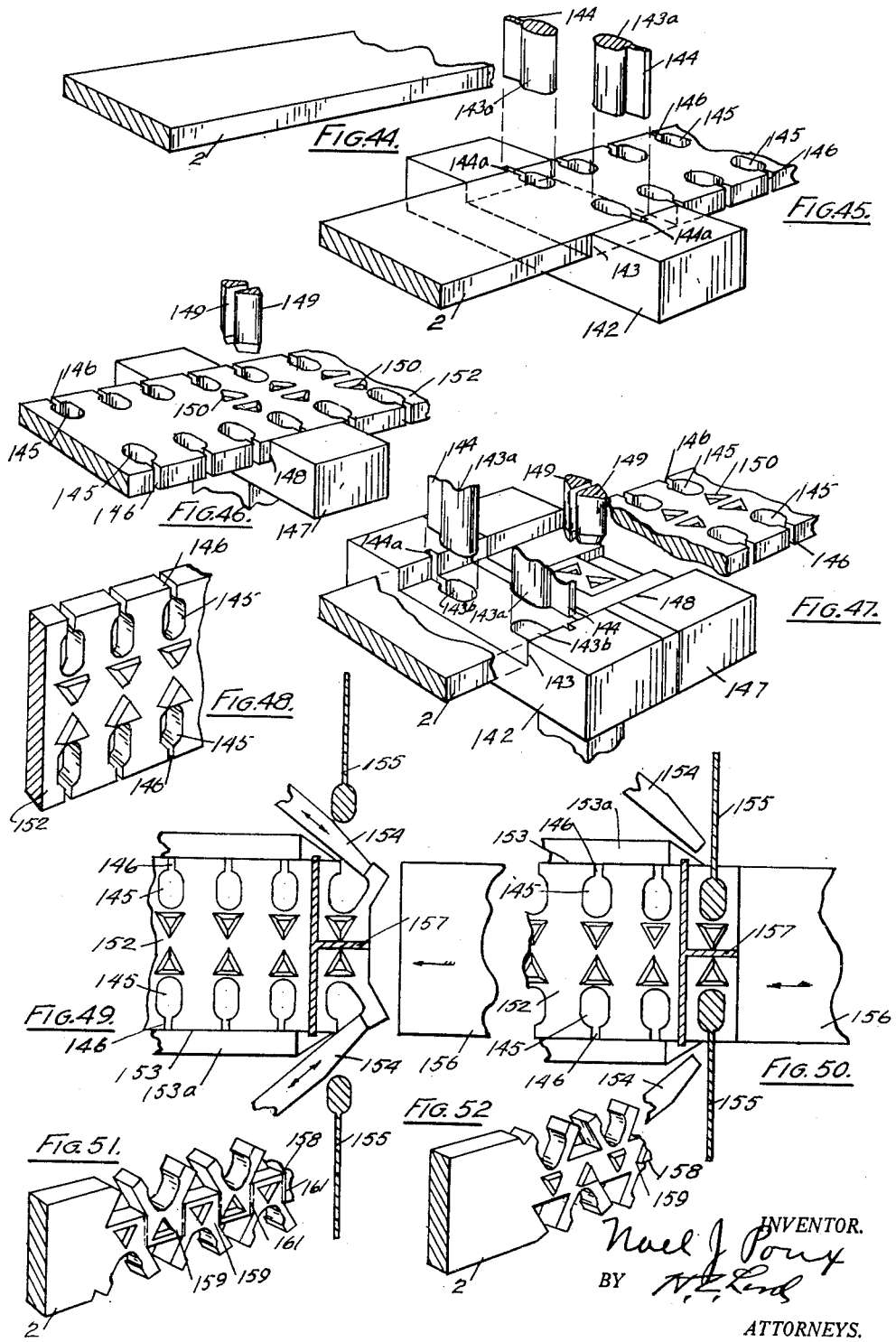

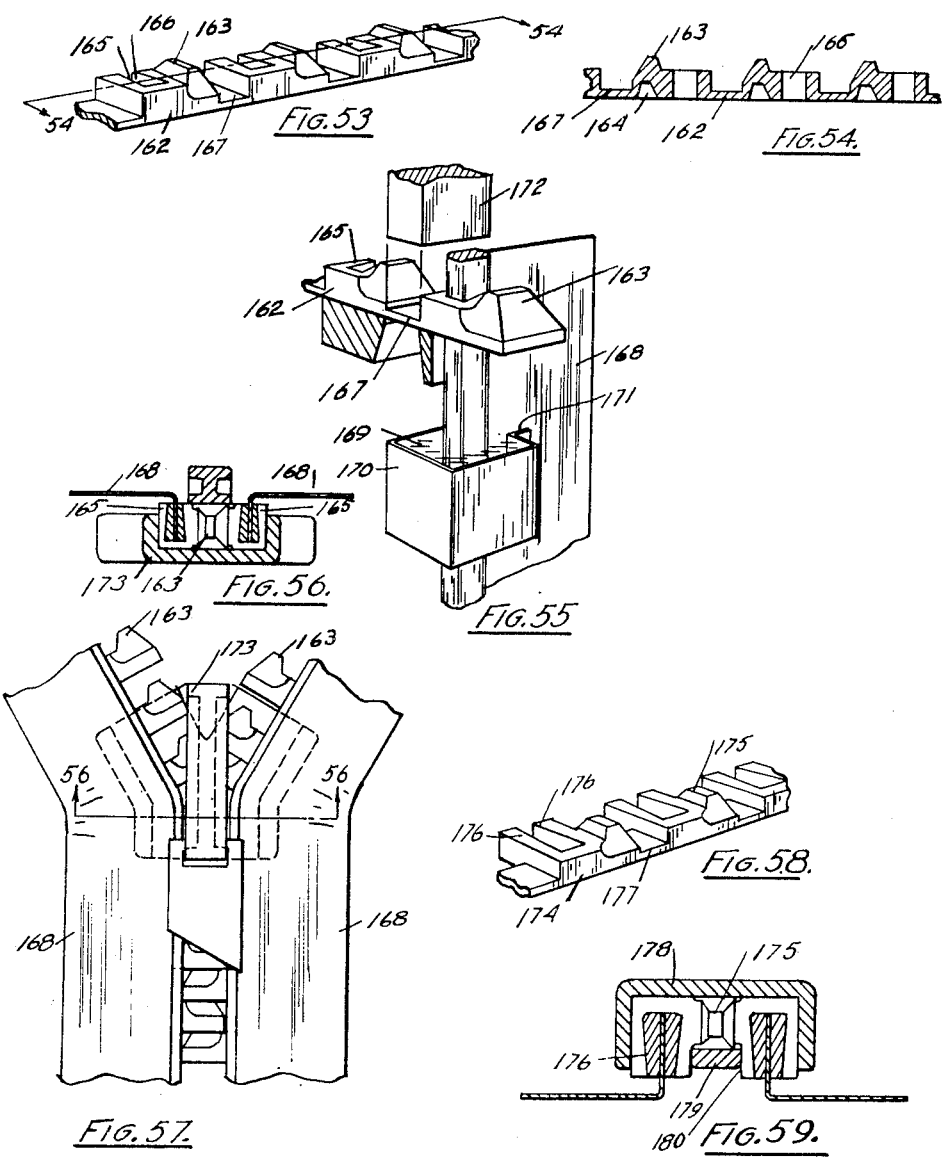

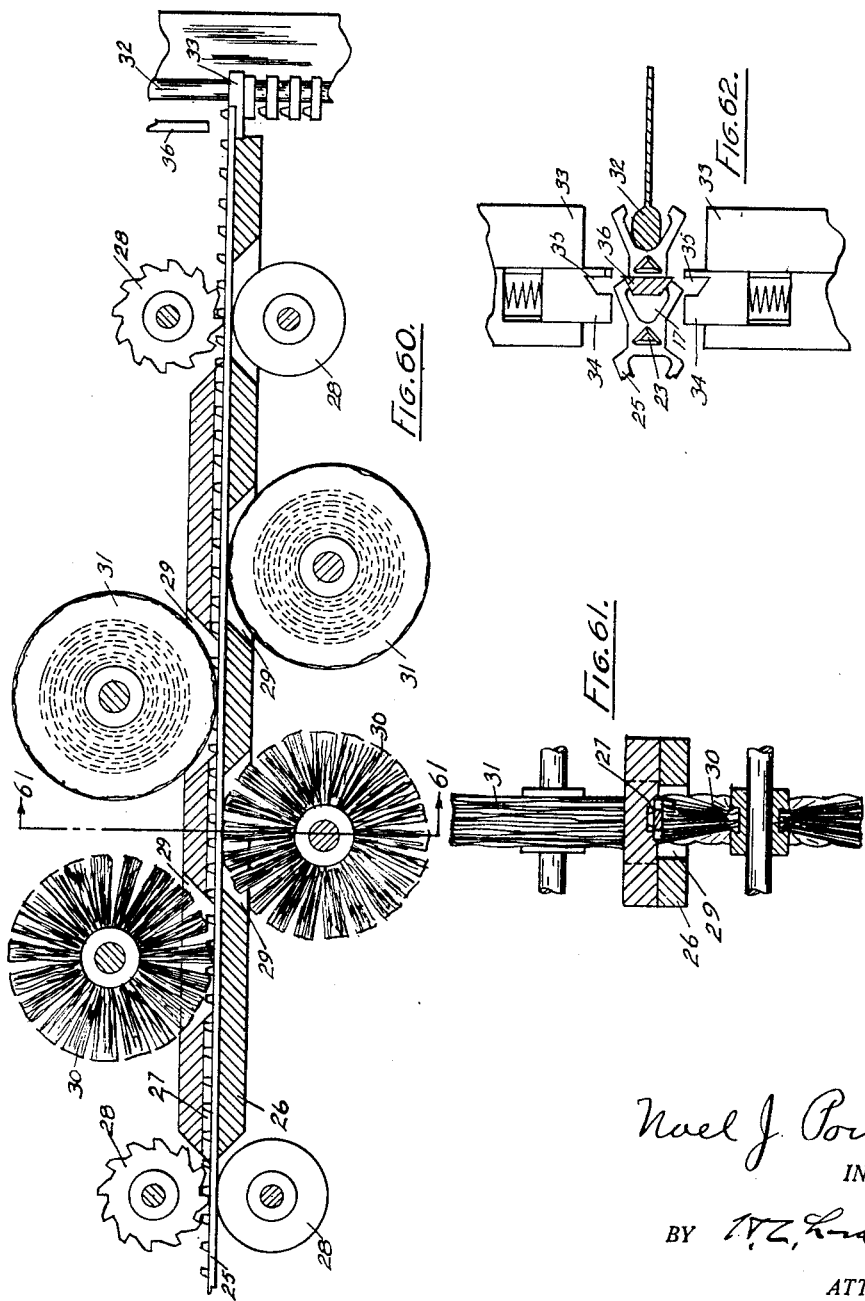

Patented Aug. 8, 1939

2,169,176

UNITED STATES PATENT OFFICE 2,169,176

METHOD OF MAKING SEPARABLE FASTENERS

Noel Joseph Poux, Meadville, Pa., assignor to Talon, Inc., Meadville, Pa., a corporation of Pennsylvania Application December 16, 1933, Serial No. 702,766
Renewed February 10, 1939

21 Claims. (Cl. 29—148)

This invention relates to separable fasteners of the zipper type and particularly to methods of making the interlocking elements and attaching them to the tapes.

It is among the objects of the invention to provide simple and inexpensive processes of forming interlocking elements and attaching them to the tapes, particularly to provide an improved process of manufacture in which a series of interlocking elements is formed as a continuous strip, to minimize and reduce the amount of scrap, and to provide an improved method in which the interlocking elements may be smoothed or otherwise processed during their manufacture.

Other objects and advantages of the invention will be apparent from the following description and accompanying drawings.

In the manufacture of separable fasteners one of the problems encountered is the forming and making of the individual interlocking members in a manner that permits of their simple and easy fabrication, and a convenient manner and apparatus for polishing and finishing the surfaces of the members and attaching the same to the tape. In the present invention I accomplish this by a very effective method and with simple apparatus by forming the individual members practically complete in a continuous strip of metal, or material from which the members are made without severing one member from another. In this way it is possible to form the members rapidly, to hold them after such formation in considerable quantities and in small space, if desired, run the strips in which the members are formed through such cleaning and polishing operations as may be desirable and then attach them to the tape and sever them from the strip. This general plan may be practiced in numerous ways. The individual members may be formed by coining, or stamping, and may be arranged in their formation lengthwise of the strip, crosswise of the strip, or in double rows. The jaws may be stamped to their open position from metal of sufficient area to supply the material, or they may be stamped, or formed with jaws in substantially closed position and forced open. These and other features and details of the invention will appear more fully from the specification and claims.

A preferred embodiment of the invention is illustrated in the accompanying drawings as follows:—

Fig. 1 shows a perspective view of a metal bar, or strip, having rounded corners from which the members may be fabricated.

Fig. 2 a similar strip having square corners.

Fig. 3 a perspective view of a strip coining or forging die coining the edges of the strip.

Fig. 4 a perspective view of a stamping or cutting die stamping the exterior edges of a strip.

Fig. 5 a perspective view of a die for punching the material from between the jaws.

Fig. 6 a stamp combining the dies of Figs. 4 and 5.

Fig. 7 a plan of a punch and die forming the recess and projection of the interlocking element.

Fig. 8 a perspective view of the die and punch forming the projection and recess.

Fig. 9 a press combining the dies of Figs. 6 and 8.

Fig. 10 a perspective view of a finished strip showing the projection side, the recess side being shown at the end of Fig. 9.

Fig. 11 shows a sectional view of the die adapted to form inclines on the members at the sides of the projections.

Fig. 12 a perspective view of a strip having the inclined sides.

In the strip so far made the members are arranged end to end and the jaws are formed initially in an open position.

Figs. 13 to 22 illustrate apparatus and means for forming the strips with the members crosswise thereof.

Fig. 13 is a perspective view of the strip blank.

Fig. 14 a perspective view of a punch press for punching the jaw slots and separating slots for the members.

Fig. 15 a perspective view of a press for forming the recesses and projections on the strip.

Fig. 16 a view indicating the completed strip as it comes from the press shown in Fig. 15.

Fig. 17 shows the press with the dies of Figs. 14 and 15 combined.

Fig. 18 a manner of spreading the jaws from a strip as it comes from the dies of Fig. 14.

Fig. 19 a similar apparatus for spreading the jaws from a strip as it comes from the dies shown in Fig. 15.

Fig. 20 illustrates a press in which the jaws and separating slots are formed in their open position.

Fig. 21 a perspective view of a die for forming the inclined sides on the members of a strip.

Fig. 22 a strip showing the inclined sides formed thereon and the formation of the jaws as they are spread.

In the method and apparatus illustrated in Figs. 23 to 32 inclusive the members are arranged end to end in the strip, but the jaws are formed initially close together and spread.

Figs. 23 and 24 show perspective views of the blank strips.

Fig. 25 a press for forming jaw slots in the strip.

Fig. 26 a press for forming the projections and recesses in the strip.

Fig. 27 the presses of Figs. 25 and 26 combined.

Fig. 28 an apparatus for spreading the jaws of a formed member, attaching the member to a tape, and cutting the attached member from the strip.

Fig. 29 a press making the first step in an alternative method forming an initial slit.

Fig. 30 a press having dies forming a recess and projection, these dies being combined with the dies of Fig. 29.

Fig. 31 a perspective view of the dies for spreading the jaws.

Fig. 32 the dies of Figs. 30 and 31 combined.

In the apparatus and method and strip shown in Figs. 33 to 39 strips with crosswise members are shown and the method of forming the same.

Fig. 33 shows a perspective view of the blank.

Fig. 34 dies cutting jaw slots in each edge of the strip.

Fig. 35 dies forming recesses and projections at opposite edges.

Fig. 36 a perspective view of the strip as it comes from the dies in Fig. 35.

Fig. 37 a perspective view of a strip having the incline added thereto.

Fig. 38 a plan view of the part of the apparatus for attaching the strip to a tape.

Fig. 39 an elevation of the same.

Figs. 40 and 41 perspective views of the finished members with straight sides.

Figs. 42 and 43 perspective views of the members with inclined sides.

The apparatus and methods shown in Figs. 44 to 52 illustrate a manner of forming strips with the members arranged crosswise of the strip and projecting from opposite sides thereof.

Fig. 44 shows a perspective view of the blank.

Fig. 45 dies for punching the jaw slots.

Fig. 46 a press for forming the projections and recesses.

Fig. 47 a combined press having the dies of Figs. 43 and 44 combined.

Fig. 48 a perspective view of the completed strip.

Fig. 49 a plan view showing a method of opening the jaws for receiving a tape.

Fig. 50 a plan view showing the method with the jaws closed on the tape and ready to be severed.

Figs. 51 and 52 alternative constructions of strips.

Fig. 53 shows a perspective view of a strip for making an alternative form of fastener.

Fig. 54 a central section of the same on the line 54—54 in Fig. 53.

Fig. 55 shows a perspective view of the apparatus for attaching the same to a tape.

Fig. 56 a sectional view of the completed fastener and slider.

Fig. 57 a plan view of the slider on the fastener.

Fig. 58 an alternative form of strip.

Fig. 59 a sectional view through the slider of the fastener formed from the strip of Fig. 58.

Fig. 60 shows a device for polishing and assembling fasteners.

Fig. 61 a section on line 61—61 Fig. 60.

Fig. 62 a plan view of jaw closing devices.

It will be noted that through the several figures dies are formed for individual operations and are ganged for progressively forming operations. These arrangements are made readily possible in that the strips are retained intact so that they can readily be run through separate machines, or machines that perform the several operations in one machine.

1 marks the strip blank with rounded edges, and 2 a strip blank having straight edges. In the structure shown in Fig. 3, 3 marks the die. This has a strip guide 3a and a cover plate 4. Side dies 5 are brought into clamping engagement with the edges of the strip by any convenient mechanism (not shown) and these are provided with recesses 6 into which the material may be forced outlining the outer edges of the spread jaws of a member.

The strip may be formed with this relation of edges by stamping, as illustrated in Fig. 4, the die 9 having a strip guide 10, a punch 11 having die faces 12 adapted to cut out the part between the jaw incline 7 forming the interlocking part 8 of the members.

The strip formed in either of the manners described may have the jaw slots punched, as shown in Fig. 5. A die 13 has a strip guide 14. The base of the guide has a cutting opening 15 and a punch 16 operates over the die to cut jaw slots 17.

The dies 9 and 13 may be arranged in tandem so that the slots 17 and edge formation may be accomplished in one operation.

The recesses and projections are formed in the faces of the strips and this may be accomplished as indicated in Fig. 8. A die block 19 has a strip slot 19a in the bottom of which is a recess 20 for forming a projection 24. Side dies 21 engage the side edges of the strip and a punch 22 forms a recess 23 in the strip.

In Fig. 9 the die 19 is associated with the die blocks 9 and 13 so that the three operations may be accomplished in one pass of the strip. Feeding rolls 13a are arranged to advance the strip through the dies and these may be provided with any well-known control mechanism to advance the strip in proper timing. It will be understood that with each of the die grooves in which the strips are advanced a similar set of feeding rolls is ordinarily to be provided.

The completed strip having the edges and jaw slots and projections and recesses formed thereon and therein is illustrated in Fig. 10. This strip may be readily processed and attached to a tape, as indicated in Fig. 60.

A guide table 26 has a guide slot 27 for feeding the strip 25. Rolls 28 are arranged at each end of the table for accomplishing a definite forward feed, the upper feed rolls 28 being notched to engage the projections. The table 26 has openings 29 above and below at intervals leading to the guide slot 27 and wire brushes 30 operate in these openings on the strip as it passes out. Buffers 31 operate through succeeding openings so that the strip may be readily processed as it advances. The strip after this polishing operation may be again rolled and stored, or it may be directly attached to the tape 32 from this operation. The end of the strip with its jaws carried straddle the tape is closed by pressure fingers 33. As the pressure fingers close die plates 34 are carried under the strip between the first and last members and these dies have die slots 35. A cutter 36 severs the last member from the strip, the cutter operating in connection with the slots 35. In some constructions it is desirable to incline the front corners of the members and this is accomplished by arranging an inclined die face 37 on the side die members 21 (see Fig. 11). This provides the inclines 38 as shown in the strip 38a (Fig. 12).

In forming the strips with the members crosswise (Fig. 13 and immediately following) the strip blank 2 is fed into a guide groove 39 of the die block 40. This die block has a die opening 41 and slots 42 and 43 which operate with a punch 44 for forming a jaw slot 45, and an extension 46 on the punch for forming a slot extension 47 of the die slot. There is provided a separation punch 48 for cutting a separation slot 49 which nearly severs the strip between a member. The strip may then be run through the dies shown in Fig. 15 having a die block 50 and a feed groove 51. The dies have a recess 52, a punch 53 for forming a projection 54 and recess 55a respectively forming as it comes from the dies a strip 55. If desired the die blocks 40 and 50 may be placed in tandem, as shown in Fig. 17, and the strip formed in one continuous operation. The completed strip, is shown in perspective in Fig. 16. The completed strip is run through die blocks 56. This die block has a transverse guide groove 57 in which a spreader punch 58 operates. The spreader punch has a cam surface 59 corresponding to the desired outer slant of the member jaw with the jaw in open condition. An opposite transverse guide slot 60 is also provided in the block 56 and this has a spreader punch 61 with a cam surface 62. As the strip is advanced, the punch 58 advances and spreads one side of the jaw of a member and while the member is held by the punch 58 the punch 61 advances and spreads the opposite jaw, thus forming an ultimate strip 63 with the jaws spread. If desired the die 56 may be arranged in tandem and with the die blocks 40 and 50 and the whole operation is completed in one progressive operation. The strip may be formed by a stamping operation in which the jaws are formed initially in spread position and such a manner of forming is indicated in Fig. 20. A die block 65 has a die groove 66. Punches 67 form slots 68 between the members and punches 69 a jaw slot 70. It may be desirable also to provide the front corners of the members with inclined surfaces and this is accomplished in the die scheme shown in Fig. 21 wherein a die block 71 has a die groove 72. A punch 73 is arranged through the bottom of the block 71 and in the face of the punch 73 there is provided a recess 74 for forming the projection 54 on the member and there are also formed on the face of the punch inclined surfaces 75. A punch 76 has a flat face of sufficient area to force the portion of the strip containing the member into coining relation to the inclined surfaces and recess. At the same time the punch 76 is provided with recess forming projections 77. Thus the strip 78 as it comes from the die 71 has inclined ends 79. The die block 71 may be substituted for the die block 50 in the die arrangements of Figs. 17 and 19 and consequently form a strip with jaw slots 80 open, as shown in Fig. 22.

The strips and apparatus for forming the same shown in Figs. 23 and following use the same bar blanks 1, or 2, as in the preceding structures. A die block 81 (Fig. 25) has a guide groove 82 through which the strip is fed and this has a jaw slot opening 83 with an extension 84 adapted to operate with a punch 85 and its extension 86 forming in the strip a jaw slot 87 with its separating extension 88. The strip so formed may be fed through a die block 89, the die block having a die groove 90 in the bottom of which is formed a recess 91 for forming a member projection 92. A punch 93 operates on the strip to form a recess 94. The die blocks 81 and 89 may be associated, as shown in Fig. 21, with a spacer block 96 between them in which event these operations may be performed progressively. This strip is presented with its forward end to a tape 98. The end member has its jaws closed on the tape by punches, such as 33, shown in Fig. 55. The member is severed by a cutter 99 corresponding to the cutter 36. Arranged on the cutter 99 is a jaw opening 100 which with the continued advance of the cutter 99 spreads the jaws of the next to the last member so as to prepare the jaws to receive the tape.

This manner of forming the members without great waste of material may be accomplished also in the manner illustrated in Figs. 29 and immediately following. In Fig. 29 a die block 101 has a die groove 102. A punch 103 forms longitudinal slots 103a. The strip is carried through a die block 104 having a die groove 105. This may be associated with the die block 101 properly spaced by spacers 106. Side punches 107 are arranged in the die block 104 to properly hold the strip as the member projections and recesses are formed, the projection being formed in the recesses 108 by a punch 108a. The strip may be run through a block 110 with a die groove 111. Side punches 113 operate in transverse grooves 112. These side punches have recesses 114 adapted to receive metal forming the outer edge of the jaws. A punch 116 is shaped to enter the slot 103. The punch has an inclined spreading surface 117 terminating in a cross sectional shape 118 desired for the jaw slot 119. This jaw spreading may take place, if desired, before or after, the forming of the projections and recesses.

In Fig. 32 the dies using the block 101, the block 110 and the block 104 are associated so that the strip 115 as a whole may be fabricated in one progressive operation.

In Figs. 33 to 38 a desirable method of forming interlocking members in strips is shown. A guide block 120 has a die groove 121 receiving the strip blank 2. Punches 122 form oppositely placed and staggered jaw slots 123 in the strip. The edge of the strip is notched by a projection 124 on the punch at 125 to form the outer edges of the jaws. A die block 126 has a die guide 127 (see Fig. 35) through which the strip coming from the block 120 is passed and punches 128 operate on the strip to form recesses 129 and the opposite projections 130a in the manner of the preceding operations. The blocks 120 and 126 may be placed in tandem, if desired.

A finished strip 130 may be attached to a tape in the manner indicated in Figs. 38 and 39. A guide block 132 has a guide groove 133 and a clamping plunger 134 engages the strip intermittently as it is fed forward. Tapes 135 are placed in the jaw slots of the two end members. A punch 136 engages the end of the strip and closes the jaws of the two members. Cutters 137 sever the members so attached to the tape on the lines 138. If desired, the strip may have inclined front corners formed in it at 139 by coining, or otherwise, as desired.

In Figs. 40 and 41 individual interlocking members 140 are shown having the recesses 23 and projections 24, these members being without the inclined front corners and in Figs. 42 and 43 individual interlocking members 141 are shown in which the front corners are inclined.

In Figs. 44 and following is shown an alternative apparatus and method for forming and attaching members from the strips. In this as in the others the strip blank 2 is used. A die block 142 has a die groove 143 through which the strip blank is fed. Punches 143a have punch extensions 144 forming jaw slots 145 with extensions 146 in the opposite sides of the strip and these are arranged directly opposite each other, the die block having openings 143b and 144a corresponding to the punch structure. The die block 147 has a die groove 148. Punches 149 form recesses 150 in the die groove forming the projections. The finished strip 152, therefore, has the interlocking projections and recesses and the jaw slots. If desired, the die blocks 142 and 147 may be set in tandem so that these operations may be performed in a continuous manner. The strip 152 is passed through a guide groove 153 in a guide block 153a and the jaws at the end of the strip are opened by punches 154. Tapes 155 are introduced into the slots and the jaws closed by a punch 156. As soon as the jaws are closed the end members are severed from each other and from the strip by a cutter 157.

In Figs. 51 and 52 an alternative form of strip 158 is shown. In this the interlocking portions of the members 159 have jaws 160 staggered and directed to opposite sides of the strip. The interlocking portions of the members 159 are in alinement at the center of the strip. The members are severed on the line 161.

In Figs. 53 to 59 are shown strips for interlocking members having jaws which may be attached by adhesion and for forming fasteners with the jaws extending toward one side or the other of the fastener instead of edgewise. In Fig. 53 a strip 162 is shown having projections 163 and recesses 164, these being of the common shape found in interlocking members of separable fasteners. The fastening jaws 165 provide a jaw slot 166 which extends edgewise instead of endwise of the member and crosswise instead of edgewise of the completed fastener. These strips have grooves 167, one wall of which forms the front wall of the final member and this forms a part of the strip which can be readily removed for separating the members. In attaching the members a tape 168 is drawn through a cementing material 169 carried by a receptacle 170, the tape itself sealing a slot 171 in the receptacle. The tape is introduced into the slot of the end member of the strip and the strip is severed by a punch 172 in the groove cutting out the bottom of the groove 167. The cementing material is of sufficient adhesiveness to secure the interlocking member. These interlocking members are operated in a slider 173 in the ordinary manner of interlocking members, the difference being that the slots open toward the same face of the fastener and the tape extends at right angles from the direction of the securing slot. This puts practically the whole fastener on one side of the tape and makes a comparatively smooth surface on the opposite side of the tape.

In Figs. 58 and 59 a slight variation of the strip and member is shown. A strip 174 has projections 175, these projections being of less width than the member. Jaws 176 extend edgewise of the member but are longer than the interlocking part of the member occupied by the projection. The strip is provided with grooves 177 for severing the strip. A slider 178 operating with the fastener of this type has one of its walls 179 arranged between the overlapping ends of the jaws in a groove 180 formed thereby. In this way the projection portions of the fastener from one face of the member are practically obviated.

In each of these methods it will be observed there is an enlongated strip of united members. This may be secured to the tape in a continuous process, or each of the steps may be readily performed independently as the strips may be readily rolled. The strips while the members are still united may be thoroughly processed, polished and finished, the only final action being the severing of the members and attachment to the tape.

What I claim as new is:

1. The method of forming interlocking members for separable fasteners which consists in shaping the said members while united in a strip, to form a plurality of interlocking members with jaws and then spreading the jaws of the various members while united in the strip through distortion of the material of the members.

2. The method of forming interlocking members for separable fasteners which consists in shaping the said members while united in a strip, to form a plurality of interlocking members crosswise of the strip with crosswise extending jaws and then spreading the jaws while the various members are united in the strip.

3. The method of forming separable fasteners which consists in advancing a strip consisting of a long continuous series of united interlocking members having spread jaws end to end to place its end member in securing relation to a tape, securing the jaws on the tape, and severing the attached member from the strip.

4. The method of forming separable fasteners which consists in advancing a strip of united interlocking members having jaws arranged crosswise of the strip to place its end member in securing relation to a tape, securing the jaws on the tape and severing the attached member from the strip.

5. The method of forming separable fasteners which consists in advancing a strip consisting of a long continuous series of united interlocking members, processing the strip as it is advanced, carrying the advance of the end member into securing relation with a tape, securing the member to a tape, and severing the attached member from the strip.

6. The method of forming interlocking members of separable fasteners which consists in shaping the said members while united in a strip, to form an elongated strip of several united interlocking members in continuous series arranged end to end and oriented in the same direction, that is, the head end of one member being juxtaposed to the jaw end of the next adjacent member.

7. The method of forming interlocking members of separable fasteners which consists in shaping the said members while united in a strip to form an elongated strip of several united interlocking members with the members arranged end to end and with the jaws spread and oriented in the same direction, that is, the head end of one member being juxtaposed to the jaw end of the next adjacent member.

8. The method of forming interlocking members of separable fasteners which consists of shaping an elongated strip of such interlocking members with jaws arranged cross-wise on the strip, with the jaws of all alternate members reversed as to relation to the edges of the strip.

9. The method of forming interlocking members of separable fasteners which consists of shaping an elongated strip of such interlocking members with jaws arranged cross-wise of the strip and with the jaws spread to receive the tape and with the alternate members having their jaws reversed relatively to the edges of the strip.

10. The method of forming interlocking members of separable fasteners which consists of shaping an elongated strip of interlocking members with jaws arranged cross-wise of the strip and with the jaws spread to receive the tape and with the alternate members having their jaws reversed relatively to the edges of the strip, and severing the strip on lines corresponding to the inclination of the jaws.

11. The method of forming the interlocking members of separable fasteners, which consists of shaping an elongated strip of interlocking members arranged cross-wise of the strip with the jaws of the alternate member in reverse relation and extending from the edges of the strip.

12. The method of forming the interlocking members of separable fasteners, which consists of shaping an elongated strip of interlocking members arranged cross-wise of the strip with the jaws of the alternate members extending from the opposite edges of the strip, and forming projections and recesses in substantial alinement for the alternate members along the strip.

13. The method of forming interlocking members for separable fasteners of the class described, in which each member has a pair of jaws, which includes spreading the jaws by force applied between the jaws and confining the material on the exterior surfaces of the jaws during such spreading action.

14. The method of forming interlocking members for separable fasteners of the class described, such interlocking members having spread-apart jaws, which includes taking a strip whose width is less than the over-all width across the spread-apart jaws, forming slots in the strip, spreading the material apart on opposite sides of each slot to provide spread jaw members united in a strip, and simultaneously confining the sides of the strip during such spreading action.

15. The method of forming slide fastener members comprising forming a strip of slide fastener members each with a head portion on one end and a pair of spread jaws on the other end in which a portion of surplus material integrally joins the head end of each member directly to the inner surfaces of the spread jaws of the next adjacent member in the strip, and punching out said surplus portion to separate the members and complete the inner surfaces of the jaws simultaneously.

16. In the method of making a strip for use in making slide fastener members, forging a continuous strip to form angular projections on opposite sides of the strip outlining the outer edges of the spread jaws of a fastener member with a portion of material between said angular projections sufficient to form one head portion of a fastener member.

17. In the method of making a strip for use in making slide fastener members, forging a continuous strip to form angular projections on opposite sides of the strip outlining the outer edges of the spread jaws of a fastener member, leaving a portion of material between pairs of said angular projections sufficient to form one head portion of a fastener member, and forming heads on such portions to provide a continuous series of partially formed fastener members in strip form.

18. In the method of forming a slide fastener member strip providing a strip of material whose width corresponds to the width of the finished fastener element, forming a series of jaws on said strip by spreading the material sidewise from about the middle of the strip with the ends of said spread jaw portions integrally connected to an adjacent portion of the strip of the original width.

19. A strip for use in making slide fastener members of the type having a head portion at one end and a jaw portion at the other end, the members being arranged in the strip in end to end relation and oriented in the same direction, the strip having along its longitudinal central portion a series of equally spaced formed heads each with a projection on one side and a formed recess on the opposite side, the sides of the strip being formed to conform to portions of the outer surfaces of the jaws, each of the heads being integrally jointd to the jaw end of the next adjacent member in the strip at the inner portions of such jaws, the ends of the jaws of all members in the strip being at least partially exposed.

20. A strip for use in making slide fastener members of the type having a head portion at one end and a jaw portion at the other end, the members being arranged in the strip in end to end relation and oriented in the same direction, the sides of the strip having angular projections conforming to the outline of the outer surfaces of the spread apart jaws of slide fastener members including not only the sides but also the ends of the jaws, and wherein the head of each member is integrally joined to the jaw end of the next adjacent member at the inner portions of such jaws.

21. A strip for use in making slide fastener members of the type having a head portion at one end and a jaw portion at the other end the members being arranged in the strip in end to end relation and oriented in the same direction, the strip having along its longitudinal central portion a series of equally spaced formed heads each with a projection on one side and a formed recess on the opposite side, the sides of the strip being formed to conform to the portions of the outer surfaces of the jaws, the portions of said strip between said head portions having disposed therein within the last-named surfaces slots conforming to the inner surfaces of the jaws of said fastener members, each of the heads being integrally joined to the jaw end of the next adjacent member in the strip at the inner portions of said jaws, the jaws being at least partially spread and the ends of the jaws of all members in the strip being at least partially exposed.

NOEL JOSEPH POUX.